Sept. 14, 1943.  R. B. SEAWRIGHT  2,329,488
LATHE DOG
Filed Dec. 16, 1941
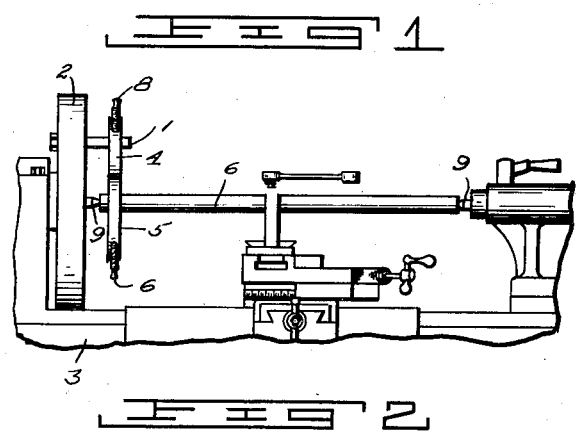
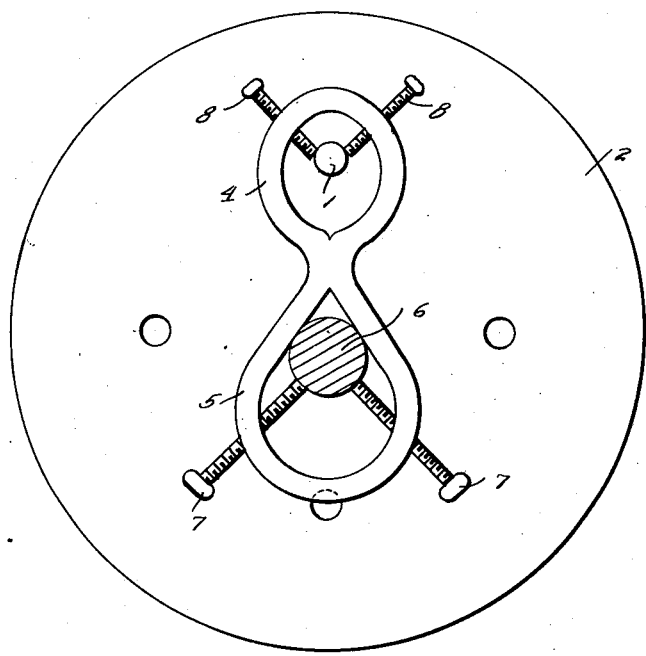
Inventor
R. B. Seawright
By Clarence A. O'Brien
Attorney Patented Sept. 14, 1943

2,329,488

UNITED STATES PATENT OFFICE 2,329,488

LATHE DOG

Robert B. Seawright, Cattaraugus, N. Y.

Application December 16, 1941, Serial No. 423,218

1 Claim. (Cl. 82—41)

The present invention relates to new and useful improvements in lathe dogs and has for its primary object to provide, in a manner as hereinafter set forth, a device of this character which will prevent the work from vibrating or chattering.

Another important object of the invention is to provide a lathe dog of the aforementioned character which is adapted to accommodate different sizes of work.

Other objects of the invention are to provide a lathe dog of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein—

Figure 1 is a view in side elevation, showing a dog constructed in accordance with the present invention in use on a lathe.

Figure 2 is a view in front elevation of the device, showing the work in cross section.

Referring now to the drawing in detail, it will be seen that the embodiment of the invention which has been illustrated comprises a headed pin or bolt 1 which is mounted in the usual face plate 2 of a conventional lathe 3.

Removably mounted on the bolt 1 is a pair of integral eyes 4 and 5 of suitable metal. As best seen in Figure 2 of the drawing, the eye 5 is larger than the eye 4.

The eye 5 is for the reception of the work 6 in the lathe. Threadedly mounted in the eye 5 is a pair of converging set screws 7 which are engageable with the work 6 for frictionally securing the dog thereto.

The eye 4 is for the reception of the bolt 1. Threadedly mounted in the eye 4 is a pair of converging set screws 8 which are engageable with the bolt 1 for supporting the dog thereon.

It is thought that the manner in which the device functions will be readily apparent from a consideration of the foregoing. Briefly, the eye 5 is firmly clamped to the work 6 through the medium of the set screws 7. The set screws 8, which rest on the bolt 1, are then adjusted for pulling upwardly on the dog with sufficient force to prevent vibrating or chattering of the work 6 on the centers 9 of the lathe 3. The construction and arrangement is such as to accommodate pieces of work of various sizes.

It is believed that the many advantages of a lathe dog constructed in accordance with the present invention will be readily understood and although a preferred embodiment of the device is as illustrated and described, it is to be understood that changes in the details of construction may be resorted to which will fall within the scope of the invention as claimed.

What is claimed is:

A lathe dog comprising a bolt for mounting on the face plate of a lathe, a pair of connected eyes, one of said eyes for the reception of a piece of work in the lathe, the other of said eyes for the reception of the bolt, means for clamping the work in said one eye, and converging set screws threadedly mounted in said other eye and engageable with the bolt for adjustably mounting the eyes on said bolt at right angles thereto and for subjecting the work to radial tension.

R. B. SEAWRIGHT.